(12) United States Patent
Streder et al.

(10) Patent No.: US 7,838,781 B2
(45) Date of Patent: Nov. 23, 2010

(54) SYSTEM FOR DETERMINING THE MASS OF AN ITEM IN MOTION

(75) Inventors: Paul Streder, San Jose, CA (US); Erik Brewster, Sunnyvale, CA (US); Lalo Ruiz, Santa Clara, CA (US); Ariesta Wibisono, Sunnyvale, CA (US)

(73) Assignee: Motion Engineering Incorporated, Santa Barbara, CA (US)

( * ) Notice: Subject to any disclaimer, the term of this patent is extended or adjusted under 35 U.S.C. 154(b) by 354 days.

(21) Appl. No.: 12/038,394

(22) Filed: Feb. 27, 2008

(65) Prior Publication Data

US 2009/0216487 A1     Aug. 27, 2009

(51) Int. Cl.
*G01G 23/01* (2006.01)
*G01G 9/00* (2006.01)
*G01G 19/40* (2006.01)

(52) U.S. Cl. .................. 177/1; 177/25.15; 702/102; 705/407

(58) Field of Classification Search .............. 177/1, 177/25.13, 25.15, 145; 702/101, 102; 705/407, 705/414–416
See application file for complete search history.

(56) References Cited

U.S. PATENT DOCUMENTS

| 3,648,839 | A | * | 3/1972 | Bradshaw et al. ......... 209/593 |
| 3,834,474 | A | * | 9/1974 | Knol ......................... 177/1 |
| 4,262,763 | A | | 4/1981 | Raskin |
| 5,040,132 | A | | 8/1991 | Schuricht et al. |
| 5,072,400 | A | | 12/1991 | Manduley |
| 5,121,328 | A | | 6/1992 | Sakai et al. |
| 5,393,939 | A | | 2/1995 | Nasuta, Jr. et al. |
| 5,939,646 | A | * | 8/1999 | Fowler .................. 73/862.193 |

(Continued)

OTHER PUBLICATIONS

"Moment of Inertia" from the "HyperPhysics" website, by Carl R. (Rod) Nave, Department of Physics and Astronomy, Georgia State University, Atlanta, Georgia 30303-3088 (http://hyperphysics.phy-astr.gsu.edu/hbase/mi.html) © C.R. Nave, 2006, pp. 1-4.*

*Primary Examiner*—Randy W Gibson
(74) *Attorney, Agent, or Firm*—David G. Maire; Dean Schron; Beusse Wolter Sanks Mora + Maire, P.A.

(57) ABSTRACT

A method (51) for measuring the mass of an object such as a letter (10) in motion. An apparatus (12) for carrying out the present invention includes a pair of rollers (16, 18) through which a letter passes. One of the rollers (16) is driven by a motor (20) which has an associated encoder (22) to give motor positional information to a controller (24). In a method of the present invention the controller generates a ramping torque signal (44) which is provided to the motor. A friction correction curve (40) is generated and applied to the torque signal, and an average torque value (C) is determined. From the positional information provided by the encoder, acceleration (50) is derived and an inertia value is obtained by dividing the average torque (C) by the acceleration. Prior to obtaining an inertia value with a letter, an initial inertia value is obtained without a letter to get a base inertia. The base inertia is subtracted from the measured inertia with a letter to get a difference $\Delta I$. The mass (M) of the letter is obtained using the formula $\Delta I = \tfrac{1}{2} M r^2$, where r is the radius of the driven roller.

13 Claims, 4 Drawing Sheets

U.S. PATENT DOCUMENTS

| | | |
|---|---|---|
| 6,107,579 A | 8/2000 | Kinnemann |
| 6,227,375 B1 | 5/2001 | Powollik et al. |
| 6,630,632 B2 | 10/2003 | Huebler et al. |
| 6,940,025 B1 | 9/2005 | Salomon |
| 7,096,152 B1 * | 8/2006 | Ong .......................... 702/173 |
| 7,297,879 B2 * | 11/2007 | Salomon ........................ 177/1 |
| 7,687,727 B2 * | 3/2010 | Turner .................... 177/25.15 |
| 2005/0205307 A1 * | 9/2005 | Salomon ........................ 177/1 |
| 2009/0071728 A1 * | 3/2009 | Turner ........................... 177/1 |

* cited by examiner

SYSTEM FOR DETERMINING THE MASS OF AN ITEM IN MOTION

FIELD OF THE INVENTION

The invention in general relates to the field of mass measurement and particularly to the measurement of an item that is in motion.

BACKGROUND OF THE INVENTION

A need exists in the mail sorting industry for a way to accurately measure the mass or weight of a postal item, such as a letter, in order to validate postage paid. One method of accomplishing this is with the use of a high accuracy scale. Such scales, however, require the slowing down or complete stopping of the sorting process. In addition, these high accuracy scales are very expensive.

Another method determines force and acceleration to compute mass by applying a known torque and monitoring velocity at start and end times of a letter being accelerated. Such method has not been found to provide a desired degree of accuracy and repeatability.

An improved method for determining the mass or weight of a letter without slowing or stopping the sorting process is desired.

BRIEF DESCRIPTION OF THE DRAWINGS

The invention is explained in the following description in view of the drawings that show.

DETAILED DESCRIPTION OF THE INVENTION

Although the present invention is applicable to determining the mass or weight of a variety of items, it will be described, by way of example, to obtaining the mass of a postal item such as a letter.

Figure 1:
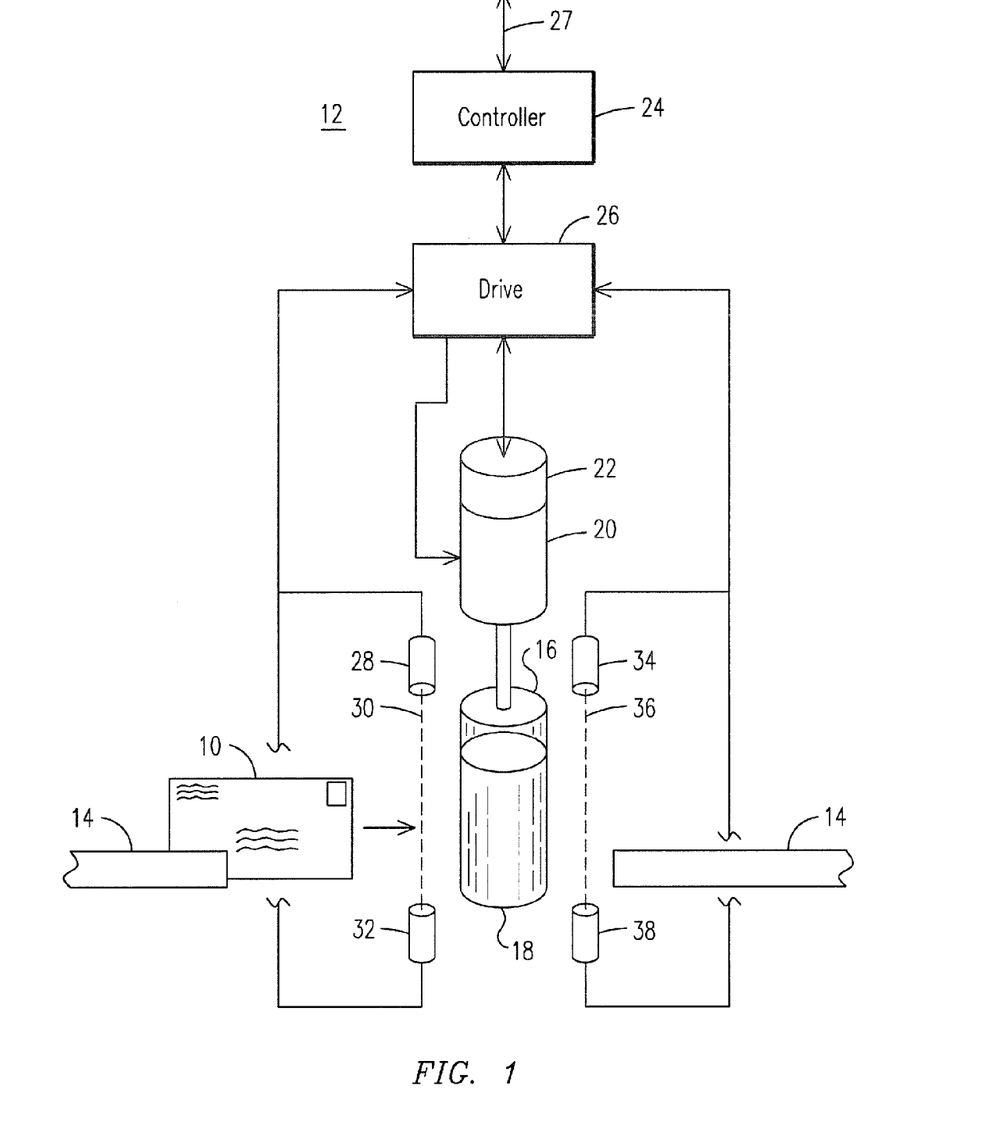
FIG. 1 is a block diagram of an apparatus used to propel a letter along a path.

An example of an apparatus for carrying out the present invention is illustrated in FIG. 1. In FIG. 1a letter 10 is carried to the apparatus 12 by an interrupted feeding belt 14. Within the apparatus 12 the letter 10 is propelled and accelerated along its path by means of engagement between first and second rollers 16 and 18, with roller 16 constituting a drive roller and roller 18 constituting an idler roller in this embodiment. The apparatus of FIG. 1 provides a means for measuring mass and weight of the letter in response to a measurement of the acceleration of the letter through the rotating apparatus 12, as is discussed more fully below.

Roller 16 is driven by a motor, one example of which is an electric motor 20 which has an attached encoder 22 operative to provide positional information responsive to motor rotation. A typical encoder 22 used with the present invention may provide millions of output counts per one rotation of the motor 20, such as a 24-bit resolution encoder. The encoder output is provided to a controller 24 via a drive circuit 26.

Within the controller 24 is circuitry for carrying out all of the computational steps for obtaining desired mass. The steps to be implemented by the controller 24 may be embodied in software, hardware or firmware, for example, and may be integral to the controller 24 or may be communicated to the controller 24 from a device external to the controller. Controller 24 is operable to provide a digital torque signal representing a commanded torque for the motor 20. This digital torque signal is coupled to the motor 20 by means of the drive circuit 26 which converts the digital torque signal to an analog current for the motor 20. For convenience of illustration a controller 24 and a motor drive 26 are illustrated separately, but one skilled in the art will recognize that the various control functions may be performed in a single device or a plurality of devices which together function as a controller in the broader sense of the word. The controller is programmed to control torque in response to a comparison of a desired velocity of the motor and an actual velocity of the motor. Data lines 27 allow the controller 24 to be connected with an external computer for programming the controller 24, as well as to allow output of calculated information.

Commencement of the torque signal may be accomplished in a number of ways. FIG. 1 illustrates one such way which includes an optical flag arrangement. More particularly, a first optical transmitter 28 is provided which generates a first optical beam 30, with the first optical beam 30 being received by a first optical receiver 32. When letter 10 breaks beam 30, a signal is sent to controller 24 via drive circuit 26 to start the torque signal. The torque signal may be stopped after a predetermined period of time; however FIG. 1 illustrates an alternative method of terminating the torque signal. This includes a second optical transmitter 34 which generates a second optical beam 36, with the second optical beam 36 being received by a second optical receiver 38. When beam 38 is interrupted by letter 10, termination of the torque signal may be accomplished after reestablishment of beam 36 when letter 10 passes.

Figure 2:
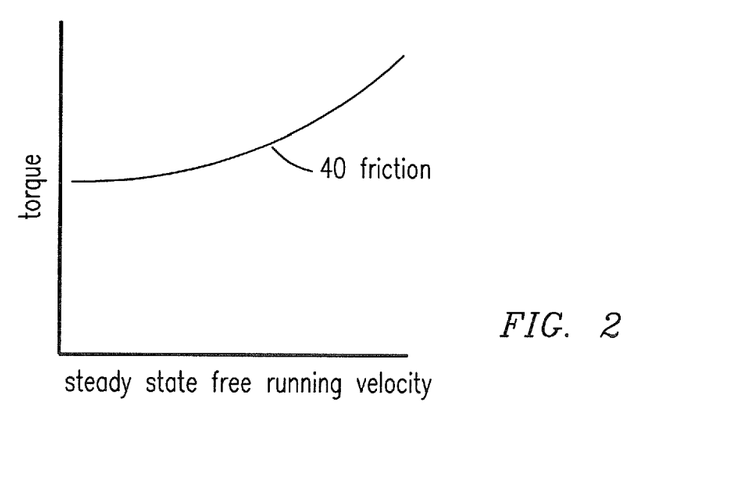
FIG. 2 is a curve illustrating the effect of friction forces in the apparatus of FIG. 1.

Because of certain frictional forces encountered during operation, all of the torque generated by the motor 20 in response to the torque signal is not applied to the letter 10. In order to obtain the most accurate mass reading, these friction forces are taken into account in the present invention. In order to apply a friction force correction, an indication of these frictional forces is initially obtained. FIG. 2 illustrates a curve 40 of the torque necessary to maintain a free running (i.e. no letter engaged in the apparatus 12) steady state roller velocity over a range of velocities, which characterizes the friction forces.

When a very small amount of torque signal is applied, the motor 10 will not move. This is due to static friction and it explains why curve 40 does not intersect a zero-zero point. To obtain the friction compensation curve 40, the torque signal is thereafter incrementally increased. For each small increment of torque signal, the motor 10 will accelerate to a new incrementally increased velocity and then will remain at that steady state velocity. This occurs when the viscous friction, which increases with velocity, comes to equal the generated torque. These values are recorded over a range of torques/velocities to obtain the friction compensation curve 40 which reflects the amount of torque that must be generated to overcome both static and viscous friction at any particular velocity. Due to wear over a period of time, as well as other factors influencing friction, it may be useful to generate a new friction correction curve periodically, for example, at least once a month depending upon the use of the apparatus 12.

Figure 3:
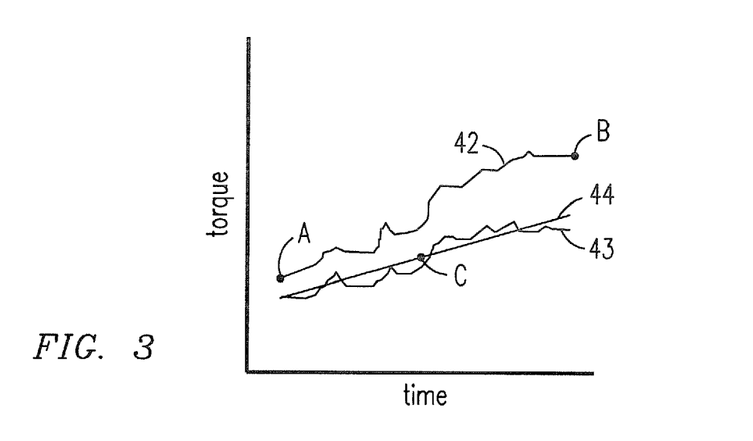
FIG. 3 is a curve illustrating commanded torque in the apparatus of FIG. 1 as adjusted to account for the friction forces of FIG. 2.

FIG. 3 illustrates the commanded torque signal 42 provided by controller 24 over a period of time. The torque signal 42 is responsive to a difference between a predetermined motor/letter velocity increase, that is stored in or is accessed by the controller 24, and a measured actual velocity of the motor/letter as determined by a signal from the encoder 22. Torque signal 42 commences at point A when letter 10 (FIG. 1) breaks beam 30, and represents the torque necessary to achieve an initial desired speed for motor 20 based upon the expected incoming velocity of the letter 10. This initial speed is specified a priori by the user based upon the design of the upstream portions of the letter sorting apparatus. The commanded torque is increased to accelerate the letter in accordance with a desired and predetermined rate of acceleration, with the controller 24 monitoring input from the encoder 22 to control the commanded torque signal 42 as necessary to achieve the desired acceleration (velocity increase over time). The ramping torque signal terminates at point B when beam 36 is reestablished and represents a final and higher speed programmed for motor 20 to attain. Thereafter, the torque signal reverts back to point A, ready for a subsequent letter. It is seen that curve 42 is extremely nonlinear. This is due in part to the fact that encoder 22, as is commercially available for such systems, is inherently noisy and its feedback signal used to regulate torque to achieve the desired acceleration contributes to the nonlinearity of curve 42. Also contributing to the nonlinearity are various physical disturbances in the system stemming from, for example, the roller assembly, bearings and other parameters that may vary over time and position. The present inventors have found that such nonlinearities can significantly degrade the performance of prior art mass measuring systems when a simple F=MA calculation is used to calculate mass based upon a measured force/torque and a measured acceleration.

Figure 4:
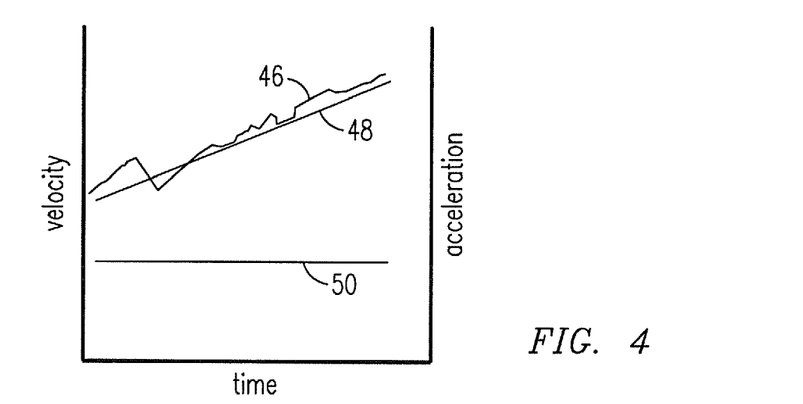
FIG. 4 is a curve illustrating velocity vs. time in the apparatus of FIG. 1 resulting from the application of the torque of FIG. 3.

During the acceleration of the letter 10 through apparatus 12, positional information from encoder 22 over time is provided to controller 24 which generates a corresponding velocity signal 46 representing the velocity of the roller 16 and letter 10 as illustrated in FIG. 4. Controller 24 is operable to read the output of encoder 22 at a predetermined sample rate. The controller 24 examines the change from one sample to another and can tell how many counts were generated by the encoder 22 between samples. Based upon these counts and the sample interval, the velocity may be calculated. The velocity signal 46 is nonlinear due to conditions previously described above with respect to the torque signal 42 of FIG. 3. The nonlinearity is removed by a curve fit program resulting in the linear velocity signal 48. The present invention utilizes an acceleration value of roller 16 (corresponding to acceleration of letter 10) to compute mass, as is discussed further below. Therefore, the torque signal 42 is ramped in order to obtain the predetermined desired increasing velocity 46, from which the actual acceleration 50 may be determined as a first derivative of the linearized measured velocity 48. Acceleration signal 50 is utilized in further computations described below.

In addition, curve 42 of FIG. 3 does not consider the frictional forces existing within apparatus 12 as discussed above. Accordingly, controller 24 is operable to apply the friction compensation curve 40 (FIG. 2) to the torque signal 42, resulting in a friction compensated torque signal 43. This is done by determining the actual velocity at each point of time, determining the frictional torque value corresponding to this velocity using curve 40, then subtracting the frictional torque value from the demanded torque value of curve 42 for each point in time. The resulting friction compensated torque signal 43 is still nonlinear, so a known curve fit program, such as the well known method of least squares, is applied to arrive at a linear torque signal 44. The average of this curve is indicated by middle point C, and it is this average which is utilized in further computations to be described below.

In accordance with an embodiment of the invention, the unknown mass of a letter 10 is calculated by computing certain inertia values. More particularly, the inertia of all of the moving components of the apparatus 12 including the letter 10 is calculated by the controller 24 in accordance with the equation:

$$I = \tau/\alpha \quad (1)$$

Where I is the total inertia of the system as measured with a letter present, $\tau$ is the computed average torque as described above with respect to point C of FIG. 3, and a is the computed acceleration as described above with respect to curve 50 of FIG. 4.

As part of the present invention, a base inertia, $I_{base}$, is obtained utilizing the same process as described above, however without a letter present. The difference between the two inertias, is $I - I_{base} = \Delta I$ where the difference, $\Delta I$, is due solely to the mass of the letter. The mass of the letter may then be determined from the equation:

$$\Delta I = \tfrac{1}{2} M r^2 \text{ (solving for } M = 2\Delta I \div r^2 ) \quad (2)$$

where M is the letter mass and r is the radius of the drive roller.

Since the torque signal is nondenominational, the calculated mass M will not be the actual mass of the letter. Accordingly, a conversion constant K must be applied. This conversion constant K is generated initially by passing a letter of known mass through the apparatus 12 and applying the above-described process to calculate a value of M from $\Delta I$. The conversion constant K is then determined as the known actual value of M divided by the calculated value of M. The calculated value of M for a letter of unknown mass may then be multiplied by K to get the actual mass of the letter.

For various applications the mass will be the desired output. However, United States postage is determined by weight in ounces rather than by mass in grams. Since the procedure derives mass in grams, it is a simple matter to obtain weight in ounces merely by multiplying by the conversion factor of 1 gm=0.03527 ozs. The ounce value of the letter or either the calculated or actual mass value may then be provided via data line 27 to a supplemental system (not shown) which would be operable to read the postage value on the letter and compare it with the required postage for the determined mass/weight.

Figure 5:
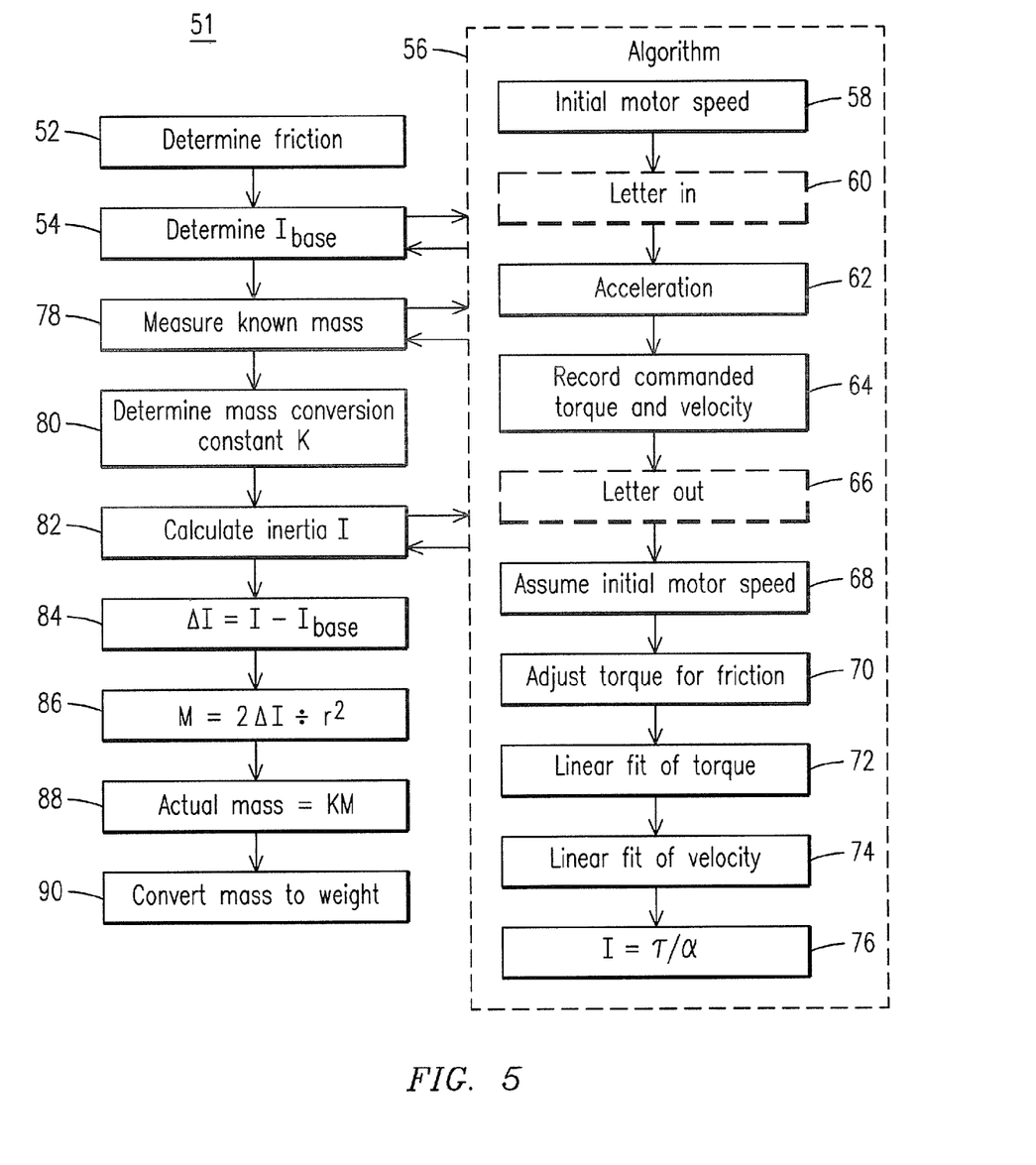
FIG. 5 is a block diagram illustrating a procedure that may be implemented with the apparatus of FIG. 1 to determine the mass or weight of a letter.

FIG. 5 illustrates a process 51 in accordance with one embodiment of the present invention. The process starts with block 52 which is the determination of a friction compensation curve 40 to account for both static and viscous friction in a mass measuring system such as apparatus 12 illustrated in FIG. 1.

Next, in block 54 the base inertia $I_{base}$ of the system 12 is determined without a letter by utilizing an algorithm 56 within controller 24. Details of algorithm 56 are also illustrated on the right side of FIG. 5. In block 58 of algorithm 56, the controller 24 instructs the motor 20 to assume an initial speed which is demanded by the torque signal at point A (FIG. 3). When determining the base inertia, the next block 60 of the algorithm, shown in dashed lines, is skipped. In block 62 the torque signal accelerates the motor velocity and in block 64 the controller 24 records the torque and velocity data as the apparatus accelerates without any letter. After skipping block 66 when determining base inertia, in block 68 the motor assumes the initial velocity determined by point A of the torque signal to be ready for a subsequent letter. In block 70 the friction correction curve is applied to adjust the demanded torque for the friction absorbed by the free running apparatus, after which a linear torque signal is obtained in block 72 such as by using the method of least squares. In block 74 the velocity curve is linearized, and the inertia of the system without a letter $I_{base}$ is obtained in block 76 using the formula Inertia=$\tau/\alpha$.

Returning once again to the process steps on the left side of FIG. 5, the mass of a letter of known mass is obtained in block 78 so as to generate a mass conversion constant for converting a calculated mass M into an actual mass value. This is accomplished with the system 12 by again using the algorithm 56, this time without skipping steps 60 and 66. The M value calculated during this run of the algorithm is then divided by the known mass to calculate the mass conversion constant K in block 80.

Knowing the system base inertia $I_{base}$ without a letter and knowing the conversion factor K for determining actual mass from a calculated mass M, the inertia of a letter of unknown mass may then be calculated using the algorithm 56 in block 82, again including blocks 60 and 66. In block 84 the base inertia is subtracted from the inertia obtained by block 82 to get $\Delta I$. Mass for the letter of unknown mass is then calculated in block 86 using the formula $\Delta I = \frac{1}{2}Mr^2$ and the actual mass is obtained in block 88 using the conversion constant K. If the weight of the letter is desired instead of mass, a conversion factor may be applied as in block 90.

Figure 6:
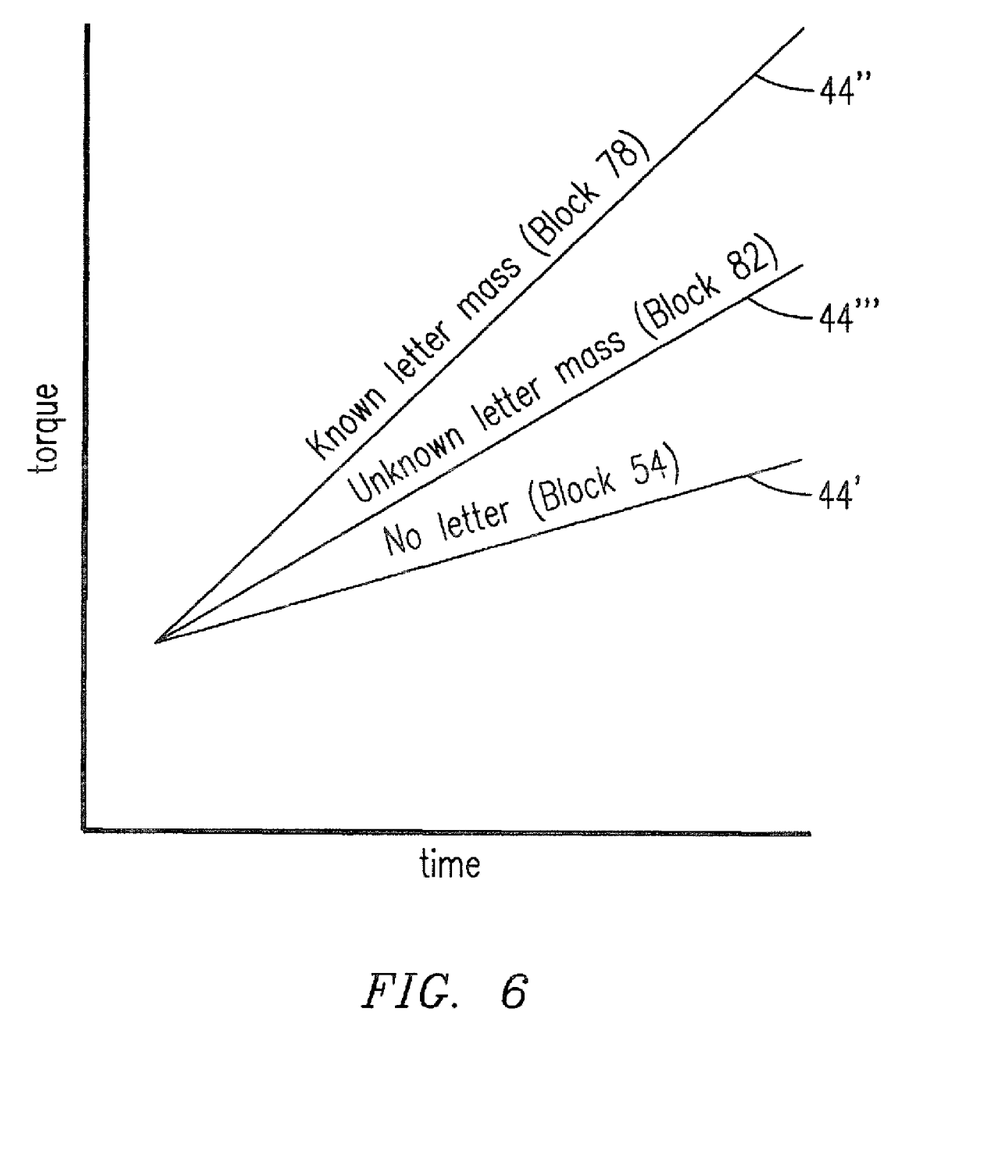
FIG. 6 is a graph that illustrates a comparison of the linearized time verses torque curve with respect to FIG. 3, for the three applications of algorithm shown in FIG. 5.

FIG. 6 illustrates a comparison of the linearized time verses torque curve 44, as described above with respect to FIG. 3, for the three applications of algorithm 56 discussed above with respect to blocks 54, 78 and 82. A first curve 44' is obtained when the apparatus 12 is run through algorithm 51 with no letter present in block 54. This run results in the calculation of $I_{base}$. A second curve 44" is obtained when the apparatus 12 is run through algorithm 51 with a letter of known mass in block 78. This run enables the calculation of the mass conversion constant K. A third curve 44''' is obtained when the apparatus 12 is run through algorithm 51 with a letter of unknown mass in block 82. This illustration assumes that the letter of unknown mass has less mass than the letter of known mass, but one skilled in the art will appreciate that curve 44''' may also appear above curve 44" in FIG. 6 if the letter of unknown mass were to have a mass greater than the letter of known mass. This third run of algorithm 51 results in the calculation of I and $\Delta I$ and enables the calculation of the unknown mass.

Based on the foregoing specification, the methods described may be implemented using computer programming or engineering techniques including computer software, firmware, hardware or any combination or subset thereof, wherein the technical effect is to allow the calculation of a mass of a moving item utilizing the inertia of an apparatus used to accelerate that item. Any such resulting program, having computer-readable code means, may be embodied or provided within one or more computer-readable media, thereby making a computer program product, i.e., an article of manufacture, according to the invention.

The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. For example, although the invention has been described by way of example with respect to a letter, it is evident that the mass or weight of other items such as small packages or CD/DVD containers may also be determined. Further, air or hydraulic motors may be used in lieu of an electric motor.

The invention has also been described with respect to a rotating apparatus used to accelerate the item; however, the invention may be applied to other types of apparatus used to accelerate an item, such as a linear acceleration system. It is thus possible to determine mass by comparing inertia with and without the accelerated item, since the mass of the item is the only unknown variable in any $\Delta I$ calculation, no matter what type of system is being used.

The invention claimed is:

1. A method of determining a mass of an item being accelerated by a rotating apparatus including opposed rollers capturing and accelerating the item, the method comprising:
   determining a base inertia of the rotating apparatus prior to capturing the item;
   determining an inertia of the rotating apparatus plus the item;
   determining an inertia of the item by subtracting the base inertia from the inertia of the rotating apparatus plus the item to determine an inertia difference; and
   determining the mass of the item according to a formula $\Delta I = \frac{1}{2}Mr^2$, where $\Delta I$ is the inertia difference, M the mass of the item, and r is a radius of a driven one of the opposed rollers;
   further comprising determining either of the base inertia or the inertia of the rotating apparatus plus the item by:
   determining a ramping torque value and a corresponding changing velocity of the rotating apparatus over a period of time;
   determining an average $\tau$ of the ramping torque value over the period of time;
   determining an average acceleration a of the rotating apparatus over the period of time; and
   determining inertia as $\tau/\alpha$.

2. A method according to claim 1, further comprising:
   determining velocity using an encoder associated with a motor driving the rotating apparatus;
   controlling the ramping torque value to achieve a desired ramp rate for the changing velocity;
   linearizing recorded data sets of the ramping torque value and velocity respectively;

determining the average torque value from the linearized ramping torque value data set; and determining the acceleration as a first derivative of the linearized velocity.

3. A method according to claim 2, further comprising adjusting a data set of ramping torque value to account for friction in the rotating apparatus prior to determining the average torque value.

4. The method according to claim 3, further comprising adjusting the data set of ramping torque values to account for friction using a friction correction curve generated by recording a data set of steady state velocity verses torque value for the rotating apparatus prior to capturing the item.

5. The method of claim 1, further comprising:
determining the ramping torque value as a nondenominational variable;
multiplying the determined mass of the item by a mass conversion constant to convert the determined mass to desired units of mass;
wherein the mass conversion constant is determined by:
determining an inertia of the apparatus plus an item of known mass in the desired units;
calculating a mass value of the item of known mass according to the formula for $\Delta I$;
determining the mass conversion constant as the value of known mass in the desired units divided by the calculated mass value.

6. A method of determining the mass of an item propelled along a path by an apparatus which includes a motor driving a first drive roller opposite which is a second idler roller and which rollers propel the item there between, the method comprising:
generating a ramping increasing torque signal;
controlling the motor in response to the ramping increasing torque signal during a time period in which no item is present;
generating a positional signal responsive to a rotational position of the motor during the time period;
deriving a velocity signal from the positional signal;
linearizing the velocity signal;
taking a first derivative of the linearized velocity signal to obtain an acceleration value;
adjusting the ramping increasing torque signal to account for friction in the apparatus;
linearizing the adjusted torque signal;
obtaining an average value of torque over the time period from the linearized torque signal;
obtaining a base inertia value by dividing the average value of torque by the acceleration value;
repeating all of the above steps with an item present between the first and second rollers to obtain an inertia value with the item present;
subtracting the base inertia value from the inertia value obtained with the item present to get an inertia difference; and
calculating the mass of the item according to the formula $\Delta I=\frac{1}{2}Mr^2$, where $\Delta I$ is the inertia difference, M the mass of the item, and r is a radius of the first roller.

7. A method according to claim 6, further comprising applying a conversion factor to the calculated mass to obtain weight.

8. A method according to claim 6, further comprising adjusting the torque signal to account for friction by:
generating a friction correction curve by measuring a steady state velocity of the motor verses each of a range of demand torque signal values; and applying the friction correction curve to the ramping torque signal to derive a friction compensated torque curve.

9. A method according to claim 6, wherein the torque signal is a nondenominational digital signal, the method further comprising:
providing a drive circuit;
providing the torque signal to the drive circuit;
converting the torque signal to an analog signal within the drive circuit for communication to the motor; and
converting the calculated mass of the item to desired units of mass.

10. An apparatus for measuring the mass of an item in motion, the apparatus comprising:
a rotating apparatus comprising a drive roller for contacting and accelerating the item and a motor for driving the drive roller;
a motor drive for controlling the motor;
a sensor providing a velocity signal to the motor drive responsive to a velocity of the motor;
a controller in communication with the motor drive;
programmed instructions executed in the controller for:
determining a base inertia of the rotating apparatus prior to contacting the item;
determining an inertia of the rotating apparatus plus the item;
determining an inertia of the item by subtracting the base inertia from the inertia of the rotating apparatus plus the item to determine an inertia difference; and
determining the mass of the item according to a formula $\Delta I=\frac{1}{2}Mr^2$, where $\Delta I$ is the inertia difference, M the mass of the item, and r is a radius of the drive roller;
further comprising programmed instructions executed in the controller for determining either of the base inertia or the inertia of the rotating apparatus plus the item by:
determining a ramping torque value and a corresponding changing velocity of the rotating apparatus over a period of time;
determining an average $\tau$ of the ramping torque value over the period of time;
determining an average acceleration a of the rotating apparatus over the period of time; and
determining inertia as $\tau/\alpha$.

11. An apparatus for measuring the mass of an item in motion, the apparatus comprising:
a drive apparatus configured to apply increasing torque over a period of time to accelerate an item from a first velocity to a second higher velocity;
a sensing apparatus configured to determine an average acceleration of the drive apparatus over the period of time; and
a calculating apparatus configured to determine an inertia of the drive apparatus plus the item as a function of the average acceleration and an average value of the torque over the period of time, and to determine a mass of the item as a function of a difference between the inertia value of the drive apparatus plus the item and an inertia value of the drive apparatus alone.

12. The apparatus of claim 11, further comprising:
an activating apparatus determining a beginning of the period of time by sensing entry of the item into the drive apparatus; and
a deactivating apparatus determining an end of the period of time by sensing departure of the item from the drive apparatus;
wherein the drive apparatus, sensing apparatus and calculating apparatus are responsive to the activating apparatus and the deactivating apparatus for recognizing the presence of the item in the drive apparatus and for then determining the mass of the item.

13. An apparatus for measuring the mass of an item in motion, the apparatus comprising:
  a means for accelerating the item in motion by applying an increasing torque;
  a means for determining an average of the increasing torque applied and the resulting acceleration of the means for accelerating plus the item;
  a means for determining an inertia of the means for accelerating plus the item; and
  a means for determining a mass of the item as a function of a difference between the inertia of the means for accelerating plus the item and an inertia of the means for accelerating without the item.

\* \* \* \* \*